UNITED STATES PATENT OFFICE.

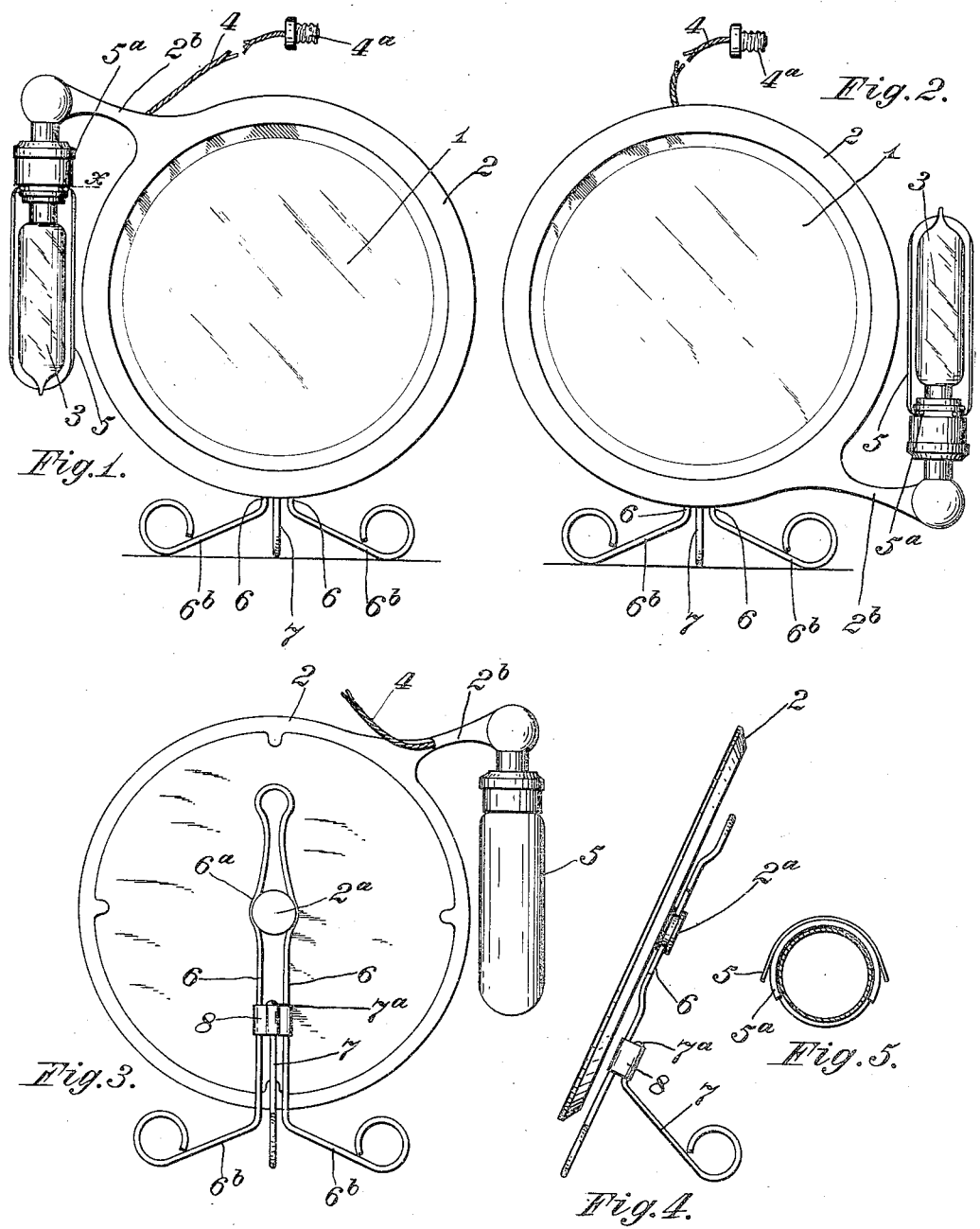

CHARLES W. ANGELL, OF LIMA, OHIO.

PORTABLE MIRROR.

940,115.  Specification of Letters Patent.  Patented Nov. 16, 1909.

Application filed July 6, 1908, Serial No. 442,023. Renewed April 10, 1909. Serial No. 489,234.

*To all whom it may concern:*

Be it known that I, CHARLES W. ANGELL, a citizen of the United States, residing at Lima, in the county of Allen and State of Ohio, have invented a certain new and useful Improvement in Portable Mirrors, of which the following is a specification.

The object of this invention is to provide a neat, compact and simple mirror especially adapted for the use of persons who do much traveling, said mirror being adapted to be conveniently carried in the valise, satchel or trunk; and in use said mirror being adapted for various adjustments to satisfactorily illuminate the face of the user.

Figure 1 is a front elevation showing the mirror turned with the lamp at the left hand side; Fig. 2 is a similar view showing the mirror with the lamp at the right hand side; Fig. 3 is a rear elevation with the parts in the position shown in Fig. 1; Fig. 4 is an edge view; Fig. 5 is a transverse section on the line $x$, Fig. 1.

In the views 1 designates the mirror and 2 the frame in which it is mounted. The back of the mirror frame is provided with a centrally located annularly grooved stud $2^a$ rigid with the frame.

3 designates an ordinary incandescent lamp, the conductors 4 for which are provided with the standard attaching plug $4^a$. The lamp has a reflector 5 provided with spring wire clamp $5^a$ for attachment to the lamp socket piece so that it can be adjusted if desired. The lamp is preferably rigidly supported on the mirror frame by means of an arm $2^b$ formed therewith.

The support or stand for the mirror comprises a spring wire frame formed with substantially parallel portions 6 bent as seen at $6^a$ to embrace and frictionally engage the stud $2^a$ and with spread ends $6^b$ constituting legs and feet. Also comprised in the support for the mirror is a third leg 7 swiveled at $7^a$ in a clip 8 that embraces the parallel parts 6. The clip is slidably adjustable on the parts 6 to vary the inclination of the mirror when supported on a horizontal surface. The clip also holds the portions 6 where they embrace the stud in close engagement with the stud so that the mirror is firmly held in the position to which it is turned in the stand. The upper portion of the wire frame constitutes a loop for hanging up the mirror if desired. Because it is swiveled the leg 7 can be folded against either of the other legs.

Among the advantages of this device are that it is simple and compact; it can be carried about in the valises or satchels of people who do much traveling, as for example commercial men and theatrical people; the mirror can be adjusted and the lamp and reflector can be turned to throw the light on just the place desired, all of which are very important and advantageous in the operation of shaving and making up.

What I claim and desire to secure by Letters Patent is:

1. In a portable mirror, the combination of a mirror and frame therefor, of a stud at the back of the mirror and a bent wire stand frame frictionally engaged with said stud.

2. In a portable mirror, the combination of a mirror and frame therefor, of a stud at the back of the mirror, and a bent wire stand frame frictionally engaged with said stud, said frame including a folding leg.

3. In a portable mirror, the combination of a mirror and frame therefor, a stud at the back of the mirror, a bent wire stand frame frictionally engaged with said stud, said frame including a folding leg, and means whereby said leg may be adjusted with reference to the mirror to change its inclination when supported on a horizontal surface, substantially as described.

4. In a portable mirror, the combination of a mirror and its containing frame, said frame having an arm rigidly secured thereto, means for frictionally and rotatively supporting the mirror at the back, an electric lamp attached to said arm of the frame, and a reflector in connection with said lamp, whereby by rotating the mirror the light of the lamp can be thrown upon either side of the face of the user of the mirror, substantially as described.

5. A portable mirror comprising, in combination, a mirror and a containing frame, means for supporting the mirror, an electric lamp and reflector, and means, in connection with the mirror, for supporting the lamp and reflector beyond the edge of the mirror and rotatively with reference to the support of the mirror, whereby said lamp and reflector can be moved, without detachment from their support, to stand either at the right hand or at left hand side of the mirror to throw the light of the lamp upon either side of the face of the user.

CHARLES W. ANGELL.

Witnesses:
H. B. HOFFMAN,
WILLIAM FETH.